May 30, 1944. H. H. HIMES 2,350,166
WINDSHIELD GLARE DIFFUSER
Filed Aug. 16, 1941 2 Sheets-Sheet 1
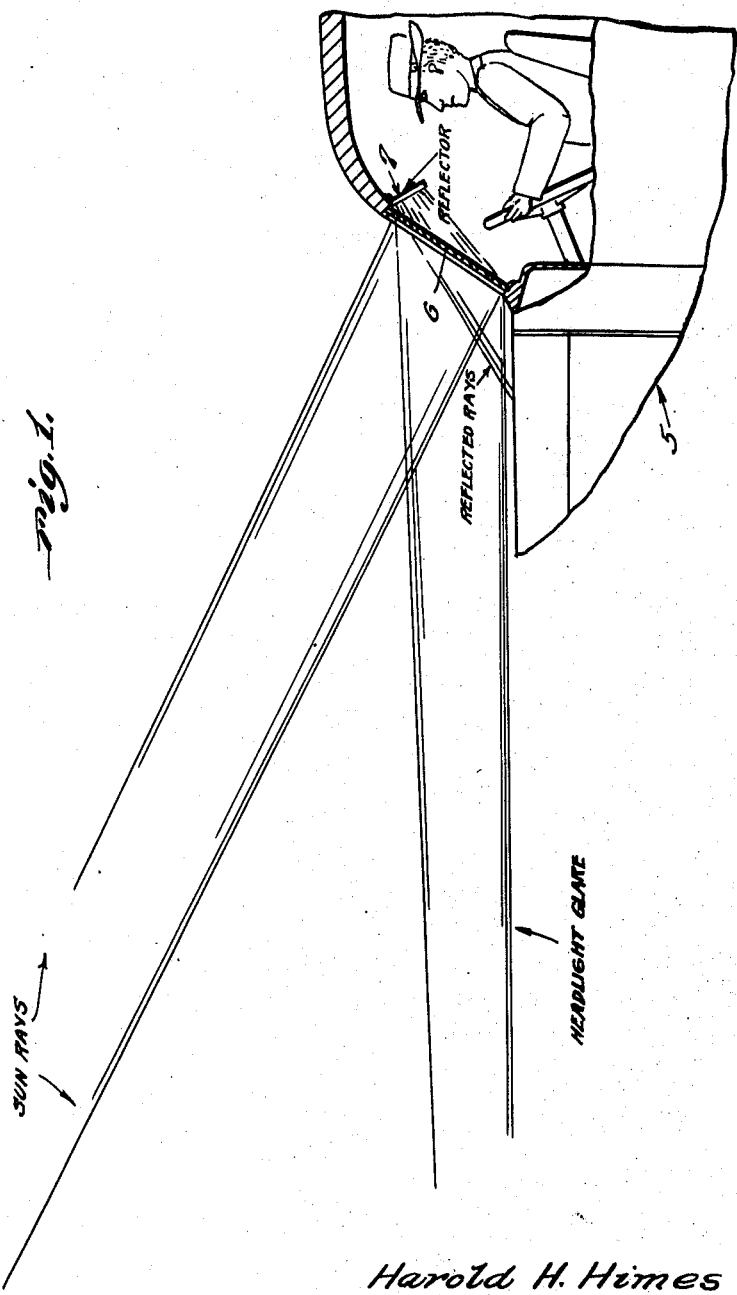
Inventor
Harold H. Himes
By Clarence A. O'Brien May 30, 1944. H. H. HIMES 2,350,166
WINDSHIELD GLARE DIFFUSER
Filed Aug. 16, 1941 2 Sheets-Sheet 2
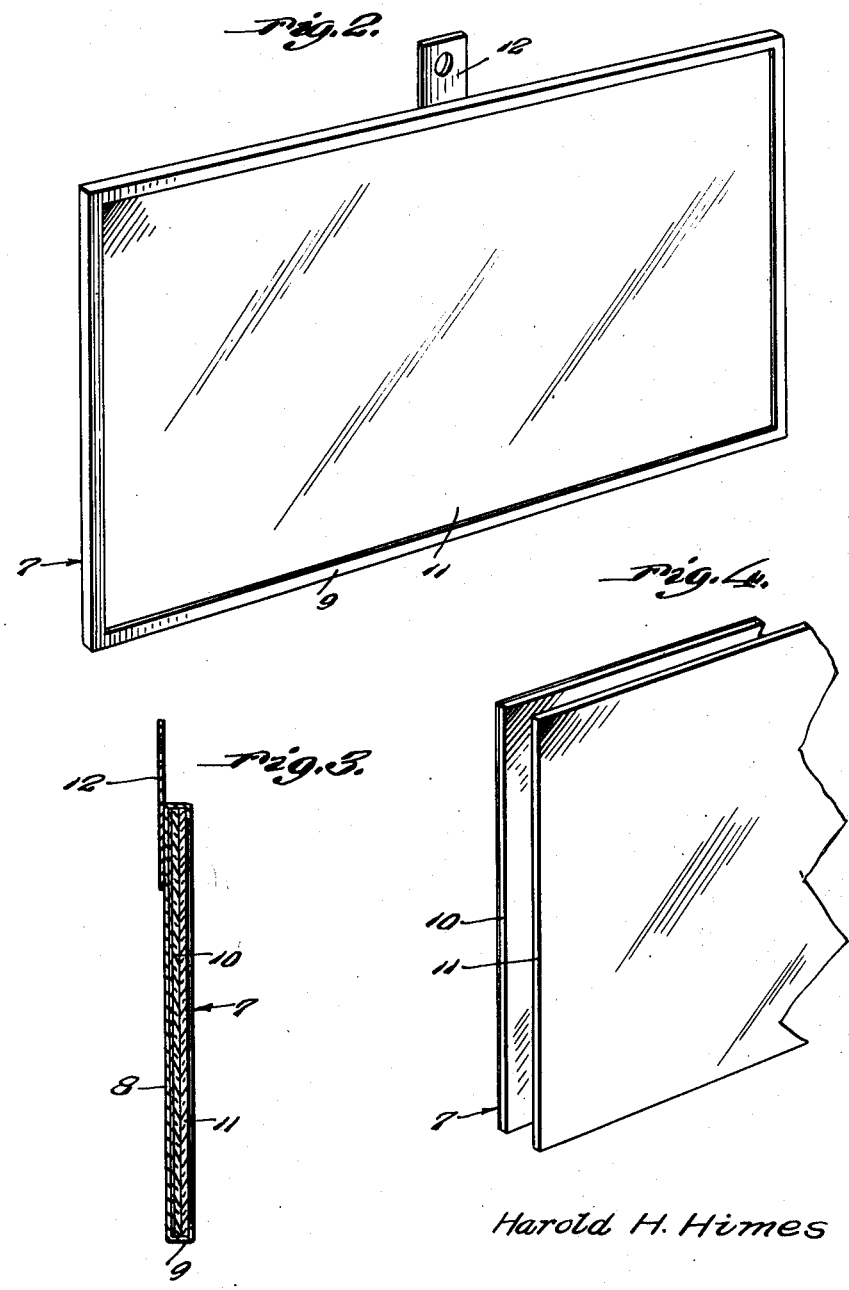
Inventor
Harold H. Himes
By Clarence A. O'Brien
Attorney Patented May 30, 1944

2,350,166

UNITED STATES PATENT OFFICE 2,350,166

WINDSHIELD GLARE DIFFUSER

Harold H. Himes, Widnoon, Pa.

Application August 16, 1941, Serial No. 407,202

1 Claim. (Cl. 296—97)

This invention relates to new and useful improvements in glare diffusers for automobile windshields, the principal object being to provide means for diffusing light of a glaring nature before it passes through an automobile windshield and affects the vision of the driver.

Another important object of the invention is to provide a device of the character stated which is of simple construction, inexpensive to manufacture and which can be easily installed for use.

These and various other important objects and advantages of the invention will become apparent to the reader of the following specification.

In the drawings—

Figure 1 represents a fragmentary side elevational view of the forward portion of an automobile showing a portion of the top and windshield in section and the invention installed in proper position with respect to the windshield.

Figure 2 is a perspective view of the device.

Figure 3 is a cross sectional view.

Figure 4 is a fragmentary perspective view showing the colored pane and the reflector.

Referring to the drawings wherein like numerals designate like parts, it can be seen in Figure 1 that numeral 5 generally refers to a conventional automobile having a slanting type windshield 6. Figure 1 shows sun rays and oncoming car headlight glare that ordinarily would strike the driver's eyes and cause momentary impairment of vision. The device of my present invention is generally referred to by numeral 7 and is installed just above the windshield 6 where it will catch any rays that would ordinarily find their way to the driver's eyes.

Due to the fact that the device 7 employs a colored glass such as amber or the like and of such material as is found in high quality sun glasses, a reflection takes place and this reflection is a conversion of either headlight glare or sun rays into colored light which is reflected on to the windshield and sets up a screen which increases or decreases in intensity with that of the sun rays or oncoming car headlight glare.

Specifically the device 7 consists of an opaque back wall 8 having a rim structure 9 for holding a mirror or reflector 10 in front of which is placed a transparent or translucent pane 11 of some suitable colored substance which in conjunction with mirror 10 is capable of producing a colored light for transmission to the windshield 6. A suitable bracket 12 is provided on the back 8 for supporting the device 7.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A light diffuser for windshields consisting of a flat mirror and a light passing pane of colored material disposed in front of said mirror flat against the same, and means to mount said diffuser on a windshield in a position to reflect the light rays from oncoming headlights downwardly and forwardly of said windshield obliquely across said rays and including an opaque back wall.

HAROLD H. HIMES.